(12) United States Patent
Brown et al.

(10) Patent No.: US 10,721,934 B2
(45) Date of Patent: Jul. 28, 2020

(54) ENHANCED PRESERVATIVE

(71) Applicant: Arch Chemicals, Inc., Atlanta, GA (US)

(72) Inventors: Scott Brown, Gainesville, GA (US); Xiao Jiang, Montvale, NJ (US); George Polson, Jasper, GA (US)

(73) Assignee: Arch Chemicals, Inc., Atlanta, GA (US)

(*) Notice: Subject to any disclaimer, the term of this patent is extended or adjusted under 35 U.S.C. 154(b) by 0 days.

(21) Appl. No.: 14/543,999

(22) Filed: Nov. 18, 2014

(65) Prior Publication Data

US 2015/0141393 A1 May 21, 2015

Related U.S. Application Data

(60) Provisional application No. 61/906,224, filed on Nov. 19, 2013.

(51) Int. Cl.
| | |
|---|---|
| *A01N 55/02* | (2006.01) |
| *A01N 33/04* | (2006.01) |
| *A01N 33/12* | (2006.01) |
| *A01N 43/80* | (2006.01) |
| *A01N 43/40* | (2006.01) |
| *C09D 5/14* | (2006.01) |
| *C09D 7/63* | (2018.01) |
| *C08K 5/47* | (2006.01) |
| *C08K 5/378* | (2006.01) |

(52) U.S. Cl.
CPC ............ *A01N 55/02* (2013.01); *A01N 33/04* (2013.01); *A01N 33/12* (2013.01); *A01N 43/40* (2013.01); *A01N 43/80* (2013.01); *C09D 5/14* (2013.01); *C09D 7/63* (2018.01); *C08K 5/378* (2013.01); *C08K 5/47* (2013.01)

(58) Field of Classification Search
None
See application file for complete search history.

(56) References Cited

U.S. PATENT DOCUMENTS

| | | |
|---|---|---|
| 2,786,847 A | 3/1957 | Cislak |
| 2,809,971 A | 10/1957 | Bernstein et al. |
| 3,159,640 A | 12/1964 | McClure et al. |
| 3,589,999 A | 6/1971 | McRae et al. |
| 3,590,035 A | 6/1971 | Damico |
| 3,773,770 A | 11/1973 | Damico |
| 4,161,526 A | 7/1979 | Gorman |
| 4,301,162 A | 11/1981 | Hasegawa et al. |
| 4,396,766 A | 8/1983 | Farmer, Jr. et al. |
| 4,482,715 A | 11/1984 | Trotz et al. |
| 4,565,856 A | 1/1986 | Trotz et al. |
| 4,581,351 A | 4/1986 | Berke et al. |
| 4,596,864 A | 6/1986 | Trotz et al. |
| 4,675,375 A | 6/1987 | Kempter et al. |
| 4,818,436 A | 4/1989 | French et al. |
| 4,888,368 A | 12/1989 | Kohl et al. |
| 4,900,651 A | 3/1990 | Hsu |
| 4,906,651 A | 3/1990 | Hsu |
| 4,935,061 A | 6/1990 | French et al. |
| 4,957,658 A | 9/1990 | French et al. |
| 4,964,892 A | 10/1990 | Hsu |
| 5,057,153 A | 10/1991 | Ruggiero |
| 5,098,473 A | 3/1992 | Hani et al. |
| 5,131,939 A * | 7/1992 | Hsu .............................. 504/138 |
| 5,137,569 A | 8/1992 | Waldron et al. |
| 5,160,527 A | 11/1992 | Law et al. |
| 5,185,033 A | 2/1993 | Hani et al. |
| 5,227,156 A | 7/1993 | Wiese |
| 5,232,493 A | 8/1993 | Waldron et al. |
| 5,246,489 A | 9/1993 | Farmer, Jr. et al. |
| 5,252,123 A | 10/1993 | Hani et al. |
| 5,266,105 A | 11/1993 | Tsuneta et al. |
| 5,298,061 A | 3/1994 | Waldron |
| 5,314,719 A | 5/1994 | Batdorf et al. |
| 5,342,437 A | 8/1994 | Gavin et al. |
| 5,401,757 A | 3/1995 | Backhouse et al. |
| 5,489,588 A | 2/1996 | Hsu |
| 5,518,774 A | 5/1996 | Kappock et al. |
| 5,541,233 A | 7/1996 | Roenigk |
| 5,562,995 A | 10/1996 | Kappock et al. |
| 5,583,091 A | 12/1996 | Backhouse et al. |
| 5,883,154 A | 3/1999 | Kappock et al. |

(Continued)

FOREIGN PATENT DOCUMENTS

| | | |
|---|---|---|
| CN | 101528043 A | 9/2009 |
| EP | 0077630 | 10/1982 |
| EP | 0482328 | 4/1992 |
| EP | 1332675 | 10/2003 |
| GB | 2230190 | 10/1990 |
| JP | S2-092881 | 8/1977 |
| JP | H08217607 | 8/1996 |
| JP | 2002020207 | 1/2002 |
| JP | 2010095517 | 4/2010 |
| MX | 2011013612 | 6/2012 |
| WO | WO 94/12028 | 6/1994 |

(Continued)

OTHER PUBLICATIONS

International Search Report and Written Opinion for PCT/US2014/066077 dated Feb. 11, 2015.
Robinson, M.A. Journal of Inorganic and Nuclear Chemistry (1964), 26(7), 1277-81. (Abstract).

*Primary Examiner* — Jianfeng Song
(74) *Attorney, Agent, or Firm* — Dority & Manning, P.A.

(57) ABSTRACT

A composition having biocidal properties is disclosed. The composition includes a first biocide, optionally a second biocide, and a biocide enhancing agent. The first biocide may comprise an isothiazolin. The second biocide may comprise a pyrithione. The biocide enhancing agent may comprise an amine, an amine salt, an amine oxide, or mixtures thereof. The amine compound may have a carbon chain length of at least six carbon atoms, such as at least eight carbon atoms.

14 Claims, No Drawings

(56) References Cited

U.S. PATENT DOCUMENTS

| | | | |
|---|---|---|---|
| 5,939,203 A | 8/1999 | Kappock et al. | |
| 6,034,081 A * | 3/2000 | Whittemore | A01N 43/50 514/210.01 |
| 6,096,122 A | 8/2000 | Kappock et al. | |
| 6,242,391 B1 | 6/2001 | Fukutani et al. | |
| 6,340,384 B1 | 1/2002 | Walker | |
| 6,375,727 B1 | 4/2002 | Walker | |
| 6,448,279 B1 * | 9/2002 | Tseng | A01N 43/80 514/372 |
| 6,572,788 B2 | 6/2003 | Walker | |
| 6,583,181 B1 | 6/2003 | Chiang et al. | |
| 6,846,777 B2 | 1/2005 | Antoni-Zimmermann et al. | |
| 6,893,752 B2 | 5/2005 | Veeramasuneni et al. | |
| 7,008,531 B2 | 3/2006 | Unhoch et al. | |
| 7,056,582 B2 | 6/2006 | Carbo et al. | |
| 7,473,474 B2 | 1/2009 | Toreki et al. | |
| 7,942,957 B2 | 5/2011 | Lee et al. | |
| 8,221,733 B2 | 7/2012 | Lichtenberg et al. | |
| 8,317,912 B2 | 11/2012 | Hyde et al. | |
| 8,362,051 B2 | 1/2013 | Tinetti et al. | |
| 8,501,725 B2 | 8/2013 | Sianawati | |
| 8,530,064 B2 | 9/2013 | Jiang et al. | |
| 2003/0199490 A1 | 10/2003 | Antoni-Zimmermann et al. | |
| 2004/0143011 A1 | 7/2004 | Lutz et al. | |
| 2004/0198703 A1 | 10/2004 | Keczer et al. | |
| 2004/0198713 A1 | 10/2004 | Heer et al. | |
| 2004/0213751 A1 | 10/2004 | Schwartz et al. | |
| 2005/0129929 A1 | 6/2005 | Patton et al. | |
| 2006/0171976 A1 | 8/2006 | Weir et al. | |
| 2007/0082170 A1 | 4/2007 | Colbert et al. | |
| 2007/0275094 A1 | 11/2007 | Thompson et al. | |
| 2008/0063723 A1 * | 3/2008 | Choi et al. | 424/489 |
| 2008/0076803 A1 | 3/2008 | Beilfuss et al. | |
| 2008/0134931 A1 | 6/2008 | Wachtler et al. | |
| 2008/0280792 A1 | 11/2008 | Williams | |
| 2009/0298805 A1 | 12/2009 | Polson et al. | |
| 2010/0239679 A1 * | 9/2010 | Greene | A01N 25/26 424/490 |
| 2011/0008610 A1 * | 1/2011 | Hayward | A01N 25/28 428/323 |
| 2011/0111245 A1 | 5/2011 | Warburton et al. | |
| 2011/0171279 A1 * | 7/2011 | Chisholm et al. | 424/411 |
| 2012/0015986 A1 | 1/2012 | Hall et al. | |
| 2012/0115834 A1 | 5/2012 | Sianawati | |
| 2012/0135974 A1 | 5/2012 | Sianawati et al. | |
| 2012/0165194 A1 | 6/2012 | Sianawati et al. | |
| 2012/0172404 A1 | 7/2012 | Beilfuss et al. | |
| 2012/0189603 A1 | 7/2012 | Beilfuss et al. | |
| 2012/0207688 A1 | 8/2012 | Guthery | |
| 2012/0219610 A1 | 8/2012 | Smith et al. | |
| 2012/0220516 A1 | 8/2012 | Smith et al. | |
| 2012/0247364 A1 * | 10/2012 | Hyde et al. | 106/18.33 |
| 2013/0109664 A1 | 5/2013 | Schwartz et al. | |
| 2013/0183362 A1 | 7/2013 | Kappock et al. | |
| 2014/0038933 A1 | 2/2014 | Polson et al. | |
| 2014/0154189 A1 | 6/2014 | Polson et al. | |
| 2014/0335365 A1 | 11/2014 | Wada et al. | |

FOREIGN PATENT DOCUMENTS

| | | |
|---|---|---|
| WO | WO 2002/072048 | 9/2002 |
| WO | WO 2004/076770 | 9/2004 |
| WO | Wo 2007/025734 | 3/2007 |
| WO | WO 2012/167368 | 12/2012 |

\* cited by examiner

ENHANCED PRESERVATIVE

RELATED APPLICATIONS

The present application is based on and claims priority to U.S. Provisional Patent application Ser. No. 61/906,224 filed on Nov. 19, 2013, which is incorporated herein by reference.

BACKGROUND

Preservatives have wide applications in fields like coatings including paints, caulks, slurries, building products, personal care, industrial, health and hygiene, pharmaceutical and wood protection. Preservatives can be a single agent or a blend of multiple agents.

Ideally, a preservative has broad-spectrum activity against all types of microorganisms at various pH levels. The preservative should also have high efficacy so that a minimum amount of the preservative can be used to save cost and to avoid or reduce any possible adverse effects caused by the preservative. Also, it is desirable that the preservative is stable to any changes in temperature encountered during manufacturing, packaging, and shipping as well as during storage of the preservative. Further, an ideal preservative is physically and chemically compatible with ingredients of different application systems so that one preservative can suitably be incorporated in various products.

In the past, various different preservatives and preservative blends have been suggested. For example, isothiazolinone compounds are widely used as biocides, isothiazolinones are known to be effective against a broad range of microorganisms.

In order to broaden even further the effectiveness of antimicrobial compositions containing an isothiazolinone, isothiazolinone has been combined with various other biocides. For example, in the past, isothiazolin biocides have been combined with pyrithione biocides. Such compositions, for instance, are disclosed in U.S. Pat. No. 8,317,912 and U.S. Patent Publication No. 2007/0275094, which are both incorporated herein by reference.

Biocides, and particularly isothiazolin biocides, however, are somewhat expensive to produce and incorporate into a product. Further, isothiazolinone at greater concentrations can be a potential skin sensitizer. Consequently, a need currently exists for an antimicrobial composition and for a preservative that contains at least one biocide, such as an isothiazolinone at reduced amounts while providing efficacy against bacteria and other microorganisms.

SUMMARY

In general, the present disclosure is direct to a composition having biocidal properties. In accordance with the present disclosure, a first biocide comprising an isothiazolinone is combined with at least one biocide enhancing agent. The biocide enhancing agent acts as a potentiator and increases the effectiveness of the first biocide against various microorganisms. In this manner, the amount of first biocide present in the composition can be reduced while still providing robust anti-microbial activity.

The biocide enhancing agent may comprise an amine, an amine salt, an amine oxide, or mixtures thereof.

In one embodiment, the biocide enhancing agent comprises the following:

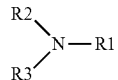

wherein: R1 is a linear, branched or cyclic C6-40 saturated or unsaturated group; and R2 and R3 are each independently of one another H or linear, branched or cyclic C1-40 saturated or unsaturated group or R2 and R3 are both taken together in combination with a nitrogen atom to which they are attached to form a cyclic or heterocyclic group, optionally substituted.

Examples of biocide enhancing agents in accordance with the present disclosure include 1-dodecylamine, cocodimethylamine oxide, 4-dodecylmorpholine, lauryl dimethyl amine, Bis(3-aminopropyl)dodecylamine, or mixtures thereof.

In one embodiment, the composition can contain a second biocide. The second biocide may comprise a pyrithione.

The composition may also contain a zinc compound and/or a polyethylenimine.

Other features and aspects of the present disclosure are discussed in greater detail below.

DETAILED DESCRIPTION

It is to be understood by one of ordinary skill in the art that the present discussion is a description of exemplary embodiments only, and is not intended as limiting the broader aspects of the present disclosure.

In general, the present disclosure is directed to a composition having biocidal properties. The composition has numerous uses and applications. In one embodiment, the composition may be used as a preservative for a product, such as a personal care product.

The composition of the present disclosure contains at least one biocide, such as at least two biocides. One of the biocides comprises an isothiazolinone. As will be described in greater detail below, the composition contains a biocide enhancing agent. Due to the presence of the biocide enhancing agent, only minimal amounts of an isothiazolin biocide need be present in the composition. In this manner, a preservative can be produced with extremely low isothiazolin biocide concentration but still formulated with sufficient strength or efficacy such that the composition provides robust preservation and antimicrobial properties.

In one embodiment, the composition of the present disclosure includes a first biocide comprising an isothiazolinone combined with a second or co-biocide that may comprise a pyrithione. The first biocide and the second biocide are combined with a biocide enhancing agent which may comprise a long chain amine. The long chain amine may comprise an amine, an amine salt, or an amine oxide and may have a carbon chain length of at least 6 carbon atoms, such as least 8 carbon atoms. Combining an isothiazolinone with a pyrithione and biocide enhancing agent in accordance with the present disclosure leads to an antimicrobial composition where the contribution from the biocide enhancing agent and the co-biocide are sufficient to provide robust product preservation even when the level of the isothiazolinone is reduced to extremely low levels. For instance, products containing the antimicrobial composition of the present disclosure may contain the isothiazolinone in amounts less than about 100 ppm, such as in amounts less than about 80 ppm, such as in amounts less than about 70 ppm, such as even in amounts less than 50 ppm. Although unknown, it was found that the inclusion of the biocide enhancing agent unexpectedly improves the efficacy of the combination so much that the level of the isothiazolin biocide in the blend can be reduced well below levels that were used in the past.

In one embodiment, in order to further enhance the antimicrobial properties of the composition, the composition may optionally contain a zinc compound to suppress pyrithione transchelation. In still another embodiment, the composition may optionally contain polyethylenimine in order to solubilize various insoluble components, such as when an insoluble pyrithione is used.

As described above, the composition of the present disclosure contains a first biocide which may be an isothiazolinone. In one embodiment, the isothiazolinone comprises an isothizaolin-3-one compound. The composition may con a single isothizaolin-3-one compound or can contain a combination of isothizaolin-3-one compounds.

The at least one 2-alkyl-4-isothiazolin-3-one can be at least one substituted or unsubstituted 2-($C_4$-$C_{10}$) alkyl-4-isothiazolin-3-one. Substituted 2-($C_4$-$C_{10}$)alkyl-4-isothiazolin-3-ones may contain ($C_1$-$C_4$)alkyl groups or chloro substituents at one or both of the 4- and 5-positions of the isothiazolin ring.

In the 2-alkylisothiazolin-3-one, the alkyl radical denotes an n-alkyl, alkyl or c-alkyl radical. The alkyl radical may comprise 1 to 10, in particular 1 to 8, carbon atoms. Particular embodiments are 2-n-octylisothiazolin-3-one and 4,5-dichloro-2-n-octylisothiazolin-3-one.

The isothiazolin-3-one compound can be an isothiazolin-3-one that is selected from: 1,2-benzisothiazolin-3-one ("BIT"), N-(n-butyl)-1,2-benzisothiazolin-3-one ("BBIT"), n-octyl-isothiazolin-one ("OIT"), 4,5-dichloro-2-n-octyl-4-isothiazolin-3-one ("DCOIT"), 2-methyl-4-isothiazolin-3-one ("MIT"), 5-chloro-2-methyl-2H-isothiazolin-3-one ("CMIT"), N-methyl-1,2-benzisothiazolin-3-one ("nMBIT"), 2,2-dithiobis(N-methylbezamide) ("DTMB"), mixtures of 5-chloro-2-methyl-4-isothiazolin-3-one ("CMIT") plus MIT (available from Rohm and Haas Company, Philadelphia, Pa. under the tradename Kathon®), and combinations thereof. Particularly preferred isothiazolin-3-ones are BIT, BBIT, and combinations thereof. In one embodiment, the preferred isothiazolin-3-one is BIT.

The first biocide comprising the isothiazolinone maybe be combined with a second biocide in accordance with the present disclosure. Combining the first biocide with a second biocide produces a composition that has a broader range of activity over different types of microorganisms and bacteria. In one embodiment, the second biocide combined with the first biocide may comprise a pyrithione.

Pyrithione is known by several names, including 2 mercaptopyridine-N-oxide; 2-pyridinethiol-1-oxide (CAS Registry No. 1121-31-9); 1-hydroxypyridine-2-thione and 1 hydroxy-2(1H)-pyridinethione (CAS Registry No. 1121-30-8). Pyrithione salts are commercially available from Arch Chemicals, Inc., such as Sodium OMADINE or Zinc OMADINE.

The pyrithione present in the antimicrobial composition can be present in a water insoluble form or in a water soluble form. The pyrithione may comprise zinc pyrithione, barium pyrithione, strontium pyrithione, copper pyrithione, cadmium pyrithione, and/or zirconium pyrithione. Other pyrithiones that may be present in the composition include sodium pyrithione, bismuth pyrithione, potassium pyrithione, lithium pyrithione, ammonium pyrithione, calcium pyrithione, magnesium pyrithione, silver pyrithione, gold pyrithione, manganese pyrithione, and/or an organic amine pyrithione. A single pyrithione may be present in the composition or a combination of any of the above may be included.

The pyrithione particles can have a particle size such that 100% of the particles have a particle size of less than about 10 microns and at least 70% of the particles have a particle size less than 5 microns such as at least about 50% of the particles can have a particle size of 1 micron or less. Particle size can be measured using a laser scattering particle size analyzer, such as a HORIBA LA 910 particle size analyzer.

The pyrithione particles can be produced by reacting pyrithione or a water-soluble salt of pyrithione, and a water-soluble polyvalent metal salt in a pressurized, turbulent flow reactor that generates pulverizing forces. The pulverizing forces produced by the pressurized, turbulent flow reactor efficiently generate pyrithione salt particles of micron size. The micron-sized pyrithione salt particles made by the method have a narrow and uniform size distribution, and have excellent surface deposition properties due to the large surface area provided by the population of micron particles.

In addition to a first biocide and a second biocide, the composition can further include a biocide enhancing agent. The biocide enhancing agent works as a potentiator for the first biocide and/or the second biocide. More specifically, the biocide enhancing agent improves the efficacy of at least the first biocide in a manner such that the level of the first biocide in the blend can be reduced below conventional levels while still providing robust antimicrobial properties. The biocide enhancing agent, in one embodiment, may comprise an amine, an amine salt, an amine oxide (collectively referred to "amine compounds"), or mixtures thereof. In accordance with the present disclosure, the amine compound has a carbon chain contained within its chemical structure that contains at least 6 carbon atoms, such as at least 8 carbon atoms, such as at least 10 carbon atoms. The carbon chain is generally less than 40 carbon atoms, such as less than 30 carbon atoms, such as less than 20 carbon atoms. In one embodiment, for instance, the carbon chain has a length of from about 8 carbon atoms to about 28 carbon atoms, such as from about 10 carbon atoms to about 24 carbon atoms, such as from about 12 carbon atoms to about 18 carbon atoms.

In one embodiment, the amine may have the following formula:

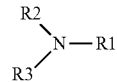

In one embodiment, R1 may be a linear, branched, cyclic, or any combination thereof of a $C_{1-40}$ saturated or unsaturated group, such as a $C_{1-20}$ saturated or unsaturated group or a $C_{6-40}$ saturated or unsaturated group, such as a $C_{1-10}$ saturated or unsaturated group or a $C_{6-22}$ saturated or unsaturated group, such as a $C_{1-5}$ saturated or unsaturated group or such as a $C_{8-18}$ saturated or unsaturated group. R1 may be an alkyl group, an alkenyl group, an alkynyl group, a hydroxyalkyl group, an alkoxy group, or an aminoalkyl group.

R2 and R3 each independently of one another may be a H or a linear, branched, cyclic, or any combination thereof of a $C_{1-40}$ saturated or unsaturated group, such as a $C_{1-20}$ saturated or unsaturated group, such as a $C_{1-10}$ saturated or unsaturated group, such as a $C_{1-5}$ saturated or unsaturated group. R2 and R3 each independently may be a H or an alkyl group, an alkenyl group, an alkynyl group, a hydroxyalkyl group, an alkoxy group, or an aminoalkyl group.

In one embodiment, R2 and R3 may be different. For instance, in one embodiment, R2 and R3 may be any of the groups mentioned above. For instance, in one embodiment, R2 and R3 may each independently of one another be a H, an aminoalkyl group such as an aminopropyl group, or an alkyl group such as a methyl group. In another embodiment, R2 and R3 may be the same. For instance, in one embodiment, R2 and R3 may both be the same group of any of the groups mentioned above. For instance, in one embodiment, R2 and R3 may both be alkyl groups such as a $C_{1-5}$ alkyl group such as a methyl group. For instance, in another embodiment, R2 and R3 may both be aminoalkyl groups such as a $C_{1-5}$ aminoalkyl group such as an aminopropyl group. For instance, in another embodiment, R2 and R3 may both be a H.

R2 and R3 may also be taken together in combination with the N to which it is attached to form a cyclic or heterocyclic group such as a morpholine, an isoxazole, an imidazole, an imidazoline, an imidazolidine, a pyrrole, a pyrrolidine, a piperazine, a piperidine, a pyrazine, a pyrimidine, a pyridazine, a pyrazolidine, an oxazole, an oxadiazole, an oxazolidine, a triazole, and the like. For instance, the N-containing compound may be a morpholine derivative, an isoxazole derivative, an imidazole derivative, an imidazoline derivative, an imidazolidine derivative, a pyrrole derivative, a pyrrolidine derivative, a piperazine derivative, a piperidine derivative, a pyrazine derivative, a pyrimidine derivative, a pyridazine derivative, a pyrazolidine derivative, an oxazole derivative, an oxadiazole derivative, an oxazolidine derivative, a triazole derivative, and the like such that R1 branches from the N to which R2 and R3 are attached.

The cyclic or heterocyclic group may be substituted or unsubstituted. For instance, the cyclic or heterocyclic group may have a second group branching from the cyclic or heterocyclic group in addition to the R1 group as identified above. The second group may be a linear, branched, cyclic, or any combination thereof of a $C_{1-40}$ saturated or unsaturated group, such as a $C_{1-20}$ saturated or unsaturated group or a $C_{6-40}$ saturated or unsaturated group, such as a $C_{1-10}$ saturated or unsaturated group such or a $C_{6-22}$ saturated or unsaturated group, such as a $C_{1-5}$ saturated or unsaturated group or a $C_{10-20}$ saturated or unsaturated group, such as a $C_{15}$-$C_{20}$ saturated or unsaturated group. This second group may be an alkyl group, an alkenyl group, an alkynyl group, a hydroxyalkyl group, an alkoxy group, or an aminoalkyl group.

The alkyl groups, alkenyl groups, alkynyl groups, hydroxyalkyl groups, alkoxy groups, and aminoalkyl groups may be any groups known in the art. For instance, the alkyl groups may include, but are not limited to methyl, ethyl, propyl, isopropyl, butyl, isobutyl, sec-butyl, tert-butyl, pentyl, isopentyl, hexyl, heptyl, octyl, nonyl, isononyl, decyl, dodecyl, tetradecyl, hexadecyl, octadecyl and icosyl, and the like. The hydroxyalkyl groups may include, but are not limited to, hydroxymethyl, hydroxylethyl, hydroxypropyl, etc. The alkoxy groups may include, but are not limited to, methoxy, ethoxy, butoxy, etc. The aminoalkyl groups may include, but are not limited to, methylamine, ethylamine, propylamine, etc. However, it should be understood that the groups are not limited to those listed. These groups may include any number of carbons within the $C_{1-40}$ saturated or unsaturated groups as defined for R1, within the $C_{1-40}$ saturated or unsaturated groups as defined for R2 and R3, and within the $C_{1-40}$ saturated or unsaturated groups as defined for the substituting group on the cyclic or hetercyclic compound.

The amine compound of the present disclosure may include a dialkylmethylamine, an alkyldimethylamine, diaikylamines, diamines, triamines, or any combination thereof. In one embodiment, the amine of the present disclosure may be a $C_{6-22}$ alkyldimethylamine, such as a $C_{8-13}$ alkyldimethylamine, such as a $C_{12-16}$ alkyldimethylamine, such as a $C_{12-14}$ alkyldimethylamine, such as a $C_{16-18}$ alkyldimethylamine, or any combination thereof.

The amine compound of the present disclosure may employ primary amines, secondary amines, tertiary amines, or a combination thereof. In one embodiment, the composition comprises at least one tertiary amine.

In one embodiment, R2 and R3 in combination with the N to which they are attached may form a heterocycle such as a morpholine. The morpholine may have the following general formula:

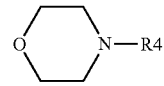

The R4 group is defined the same as the R1 group above. For instance, R4 may be a linear, branched, cyclic, or any combination thereof of a $C_{1-40}$ saturated or unsaturated group, such as a $C_{1-20}$ saturated or unsaturated group or a $C_{6-40}$ saturated or unsaturated group, such as a $C_{1-10}$ saturated or unsaturated group or a $C_{6-22}$ saturated or unsaturated group, such as a $C_{1-5}$ saturated or unsaturated group or such as a $C_{5-18}$ saturated or unsaturated group. R1 may be an alkyl group, an alkenyl group, an alkynyl group, a hydroxyalkyl group, an alkoxy group, or an aminoalkyl group.

In one embodiment, the morpholine may be a $C_{6-24}$ alkylmorpholine, such as a $C_{8-20}$ alkylmorpholine, such as a $C_{10-16}$ alkylmorpholine, or any combination thereof. In one embodiment, R4 may be an alkyl group such as a $C_{12}$ alkyl.

It should be understood that the morpholine may also be a substituted morpholine wherein the H atoms on the carbons of the morpholine heterocycle are replaced or substituted. For instance, substitution may occur at the 2, 3, 5, and/or 6 positions of the morpholine heterocycle. For instance, the morpholine may have a second group branching from the morpholine heterocycle in addition to the R4 group as identified above. The second group may be a linear, branched, cyclic, or any combination thereof of a $C_{1-40}$ saturated or unsaturated group, such as a $C_{1-20}$ saturated or unsaturated group or a $C_{6-40}$ saturated or unsaturated group, such as a $C_{1-10}$ saturated or unsaturated group or a $C_{6-22}$ saturated or unsaturated group, such as a $C_{1-5}$ saturated or unsaturated group or a $C_{10-20}$ saturated or unsaturated group, such as a $C_{15}$-$C_{20}$ saturated or unsaturated group. This second group may be an alkyl group, an alkenyl group, an alkynyl group, a hydroxyalkyl group, an alkoxy group, or an aminoalkyl group.

The morpholine may be a morpholine derivative such that the R4 group is attached to the N in the morpholine heterocycle. As such, the R4 group may be attached to the 4-position of the heterocycle.

In one embodiment, R2 and R3 in combination with the N to which they are attached may form a heterocycle such as an imidazoline. The imidazoline may have the following general formula:

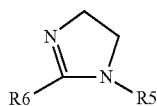

The R5 group is defined the same as the R2 or R3 group above. For instance, R5 may be a linear, branched, cyclic, or any combination thereof of a $C_{1-40}$ saturated or unsaturated group, such as a $C_{1-20}$ saturated or unsaturated group, such as a $C_{1-10}$ saturated or unsaturated group, such as a $C_{1-5}$ saturated or unsaturated group. R5 may be a H or an alkyl group, an alkenyl group, an alkynyl group, a hydroxyalkyl group, an alkoxy group, or an aminoalkyl group. In one embodiment, R5 may be a hydroxyalkyl such as a $C_{1-10}$ hydroxyalkyl, such as a $C_{1-5}$ hydroxyalkyl, such as a hydroxyethyl group.

It should be understood that the imidazoline may be a substituted imidazoline wherein the H atoms on the carbons of the imidazoline heterocycle are replaced or substituted. For instance, substitution may occur at the 2, 4, and/or 5 positions of the imidazoline heterocycle. As indicated above, the imidazoline may also be substituted with an R6 group at the 2 position. However, it should be understood that the imidazoline may also be unsubstituted such that the R6 is a H.

When substituted, R6 may be a linear, branched, cyclic, or any combination thereof of a $C_{6-40}$ saturated or unsaturated group, such as a $C_{6-22}$ saturated or unsaturated group, such as a $C_{10-20}$ saturated or unsaturated group, such as a $C_{15-20}$ saturated or unsaturated group. R6 may be an alkyl group, an alkenyl group, or an alkynyl group. In one embodiment, R6 is an alkenyl group, such as a $C_{10-20}$ alkenyl group, such as a $C_{15-20}$ alkenyl group, such as a $C_{17}$ alkenyl group.

The amine compound of the present disclosure may also be used in the form of a salt. The salt can be formed from any of the amine compounds described above. The salt can be an acid addition salt. The acid forming the salt may be an inorganic acid or an organic acid. The acid may be, for instance, hydrochloric acid, a carboxylic acid, or the like.

Particular amine compounds which may be used in accordance with the present disclosure include 1-dodecylamine, lauryl dimethyl amine, BIS(3-aminopropyl)dodecylamine, 4-dodecylmorpholine, and salts thereof, and mixtures thereof.

In one embodiment, the amine compound may comprise an amine oxide.

The amine oxide may have the following general formula:

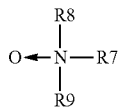

R7 may be a linear, branched, cyclic, or any combination thereof of a $C_{6-40}$ saturated or unsaturated group, such as a $C_{6-22}$ saturated or unsaturated group, such as a $C_{6-18}$ saturated or unsaturated group, such as a $C_{10}$-$C_{16}$ saturated or unsaturated group. R7 may be an alkyl group, an alkenyl group, or an alkynyl group.

R8 and R9 each independently of one another may be a H or a linear, branched, cyclic, or any combination thereof of a $C_{1-40}$ saturated or unsaturated group, such as a $C_{1-20}$ saturated or unsaturated group, such as a $C_{1-10}$ saturated or unsaturated group, such as a $C_{1-5}$ saturated or unsaturated.

R8 and R9 each independently of one another may be a H or an alkyl group, an alkenyl group, an alkynyl group, a hydroxyalkyl group, an alkoxy group, or an aminoalkyl group. In one embodiment, R8 and R9 may be different. In another embodiment, R8 and R9 may be the same. For instance, in one embodiment, R8 and R9 may both be a $C_{1-5}$ alkyl group such as a methyl group.

The alkyl groups, alkenyl groups, alkynyl groups, hydroxyalkyl groups, alkoxy groups, and aminoalkyl groups may be any groups known in the art. For instance, the alkyl groups may include, but are not limited to methyl, ethyl, propyl, isopropyl, butyl, isobutyl, sec-butyl, tert-butyl, pentyl, isopentyl, hexyl, heptyl, octyl, nonyl, isononyl, decyl, dodecyl, tetradecyl, hexadecyl, octadecyl and icosyl, and the like. The hydroxyalkyl groups may include, but are not limited to, hydroxymethyl, hydroxyethyl, hydroxypropyl, etc. The alkoxy groups may include, but are not limited to, methoxy, ethoxy, butoxy, etc. The aminoalkyl groups may include, but are not limited to, methylamine, ethylamine, propylamine, etc. However, it should be understood that the groups are not limited to those listed. These groups may include any number of carbons within the $C_{6-40}$ saturated or unsaturated groups as defined for R1 and within the $C_{1-40}$ saturated or unsaturated groups as defined for R8 and R9.

The amine oxide of the present disclosure may be a $C_{6-22}$ alkyldimethylamine oxide, such as a $C_{6-18}$ alkyldimethylamine oxide, such as a $C_{16-18}$ alkyldimethylamine oxide of such as a $C_{10-14}$ alkyldimethylamine oxide, such as a $C_{12-14}$ alkyldimethylamine oxide, or any combination thereof.

For instance, specific examples of amine oxides that may be used according to the present disclosure include, but are not limited to, hexyldimethylamine oxide, heptyldimethylamine oxide, octyldimethylamine oxide, nonyldimethylamine oxide, n-decyldimethylamine oxide, undecyldimethylamine oxide, isododecyldimethylamine oxide, n-dodecyldimethylamine oxide, cocodimethylamine oxide, myristyldimethylamine oxide, isotridecyldimethylamine oxide, tetradecyldimethylamine oxide, lauryldimethylamine oxide, pentadecyldimethylamine oxide, stearyldimethylamine oxide, hexadecyldimethylamine oxide, heptadecyldimethylamine oxide, octadecyldimethylamine oxide, stearyldimethylamine oxide, or any combination thereof.

In one embodiment, the amine oxide of the present disclosure may be obtained from a tertiary amine such that the amine oxide is a trialkylamine oxide. In one embodiment, the saturated or unsaturated groups may comprise coco, hydrogenated tallow, or soya. In one embodiment, the amine oxide may be derived from a mixture of coconut fatty acids such that it is a cocoalkylamine oxide such as a cocodimethylamine oxide.

In one embodiment, the composition may comprise more than one amine oxide. For instance, the composition may comprise any of the above amine oxides in combination.

In one embodiment, the composition may comprise a combination of at least a dodecyldimethylamine oxide, a tetradecyldimethylamine oxide, and a hexadecyldimethylamine oxide. In another embodiment, a combination of amine oxides may be utilized wherein the R1 group has the following chain distribution wherein the % is based on the total number of R1 carbon chains: $C_{10}$ (0-10%, such as 0-5%), $C_{12}$ (60-80%, such as 65-75%), $C_{14}$ (20-40%, such as 25-35%), $C_{16}$ (5-15%, such as 5-10%), $C_{18}$ (0-10%, such as 0-5%). The average chain length of all of the R1 groups of the amine oxides may be from about 10 to about 20 carbons, such as from about 11 to about 17 carbons, such as from about 12 to about 14 carbons. As such, the amine oxides may be comprised of primarily a $C_{12}$ amine oxide, such as a $C_{12}$ dimethylamine oxide such that the $C_{12}$ amine oxide is present in an amount greater than the other amine oxides.

The composition of the present disclosure can be first formulated into a concentrate which can then be diluted and added to a final product. The relative amounts of the different components can vary significantly based on many factors. The factors include the type of biocides used, the type of amine compound used, the end use application, and the desired result. In one embodiment, the first biocide comprising the isothiazolinone may be present in relation to the second biocide which may comprise a pyrithione at a weight ratio from about 1:200 to about 10:1, such as from about 1:100 to about 1:1. For many applications, the second biocide will be present in amounts greater than the first biocide. For instance, the weight ratio between the first biocide and the second biocide can be from about 1:10 to about 1:1, such as about 1:8 to about 1:2, such as about from 1:6 to about 1:4.

The amount of the first biocide in relation to the amine compound can be from about 1:600 to about 2:1, such as from about 1:400 to about 1:2. For many applications, the amine compound will be present in greater amounts than the first biocide. For example, the weight ratio between the first biocide and the amine compound can be from about 1:100 to about 1:2, such as from about 1:40 to about 1:3, such as from about 1:10 to about 1:3.

The amine compound alone or in combination with the second biocide allows for the composition to have minimal amounts of the first biocide while still remaining effectatious. In this regard, the final product may contain the first biocide in an amount less than about 200 ppm, such as in an amount less than about 150 ppm, such as an amount less than about 100 ppm, such as an amount less than about 75 ppm, such as even in an amount less than 50 ppm. In general, the first biocide will be present in an amount of at least 5 ppm, such as at least 10 ppm, such as at least 20 ppm. The second biocide may be present in an amount from about 20 ppm to about 1,000 ppm, such as from about 20 ppm to about 500 ppm, such as from about 25 ppm to 180 ppm. The amine compound, on the other hand, may be present in the composition in an amount from about 100 ppm to about 3,000 ppm. For instance, the amine compound may be present in an amount greater than about 200 ppm, such as an amount greater than 250 ppm, such as an amount greater than about 300 ppm, such as an amount greater than about 400 ppm. The amine compound is generally present in an amount less than about 3,000 ppm, such as less than about 2,500 ppm, such as less than about 2,000 ppm, such as less than about 1,500 ppm, such as less than about 1,200 ppm. The above weight ratios and concentrations are based on the total amount of each component such as if a mixture of amine compounds were used.

In addition to a first biocide, optionally a second biocide, and an amine compound, the composition can contain various other components and ingredients. In one embodiment, for instance, a zinc compound may be present that suppresses unwanted transchelation reactions, such as unwanted pyrithione transchelation reactions.

Suitable zinc compound is selected from the group consisting of zinc salts of organic acids, zinc salts of inorganic acids, zinc oxides, zinc hydroxides, and combinations thereof. Illustrative zinc salts include zinc chloride, zinc sulfide, zinc sulfate, zinc carbonate, basic zinc carbonate (also known as "hydroxy-containing zinc carbonate", or "zinc hydroxy carbonate" which is further identified by the empirical formula $Zn_5(OH)_6(CO_3)_2$), and combinations thereof. The zinc compound provides a source of metal ion in the antimicrobial composition. In one embodiment, the zinc compound suitable for use in the composition of the invention is zinc oxide.

The zinc compound may be present in the final product in an amount from about 45 ppm zinc oxide to about 600 ppm zinc oxide (about 55 ppm zinc oxide to about 750 ppm zinc oxide).

In another embodiment, the composition may contain a solubilizer for any insoluble components, and particularly for an insoluble pyrithione. The solubilizer may comprise a polyethylenimine. The polyethylenimine may comprise and oligomer or a polymer. The polyethylenimine may have a branch structure and it may have a molecular weight from about 400 Daltons to about 1 million Daltons. In one embodiment, a lower molecular weight polyethylenimine is used. For instance, the molecular weight may be less than about 200,000, such as less than about 100,000, such as less than about 50,000, such as less than about 20,000, such as less than about 10,000, such as less than about 5,000, such as less than about 2,000, such as less than about 1,000.

When included in the composition, the polyethylenimine may be present in the final product in a concentration of from about 50 ppm to about 1000 ppm.

In one embodiment, the composition can further contain one or more surfactants. Suitable anionic surfactants having a sulfate moiety include sulfates represented by the formula $RSO_4M$, wherein R is a chain containing from about 10 to about 18 atoms at the backbone of the chain, M is a cation such as ammonium; alkanolamines, such as triethanolamine; monovalent metals, such as sodium and potassium; and polyvalent metals, such as magnesium, and calcium. In one embodiment, the anionic surfactants having a sulfate moiety are alkyl sulfates wherein R is an alkyl having from 10 to 18 carbon atoms, preferably from 10 to 16 carbon atoms, more preferably from 10 to 14 carbon atoms, R can be a straight or branched chain. Advantageously, R is a straight chain. In one embodiment, R is an octyl group.

Exemplary alkyl sulfates include sodium dodecyl sulfate, potassium dodecyl sulfate, triethylamine dodecyl sulfate, triethanolamine dodecyl sulfate, monoethanolamine dodecyl sulfate, diethanolamine dodecyl sulfate and ammonium dodecyl sulfate.

Suitable anionic surfactants having a sulfonate moiety include sulfonates having the formula $RSO_3M$, wherein R is a straight or branch chain containing 10 to 18 atoms at the backbone of the chain, M is a cation such as ammonium; alkanolamines, such as triethanolamine; monovalent metals, such as sodium and potassium; and polyvalent metals, such as magnesium, and calcium. In one embodiment, R contains a succinate group at the backbone. In another embodiment, R is an alkyl group containing from about 10 to about 18 carbon atoms, preferably from about 10 to about 16 carbon atoms, more preferably, from about 10 to about 14 carbon atoms.

Exemplary sulfonates suitable for the composition of the invention includes sodium dioctyl sulphosuccinate, and primary and secondary alkyl sulphonates.

Suitable anionic surfactant (ii) is an alkylaryl sulfonic acid or salt thereof wherein the alkyl portion contains from about 10 to about 18 carbon atoms, and the aryl portion contains a benzyl or substituted benzyl group. In one embodiment, the alkylaryl sulfonic acid is represented by the formula

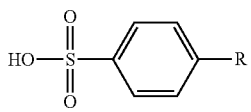

wherein R is an alkyl having from about 10 to about 18, preferably from 10 to 16, more preferably from 10 to 14 carbon atoms. In one embodiment, R is a C12 alkyl group.

Whether a surfactant is present may depend upon the end use application of the composition. In this regard, the composition (concentrate or final product) may contain and emulsifier, a consistency factor, an emollient, a thickener, a filler, a lubricant, a fragrance, and the like.

The composition of the present disclosure, as described above, can be formulated as a concentrate and incorporated into numerous and different products. In one embodiment, for instance, the composition may be included in a coating composition. The coating composition may comprise a paint, a latex emulsion, a polymer emulsion, an adhesive, a sealant, a caulk, a mineral or pigment slurry, a printing ink, a pesticide formulation, a household product, a personal care product, a metal working fluid, and the like. In addition, the composition may be included in any suitable building material.

In general, the composition of the present disclosure can be incorporated into any suitable personal care product. For instance, the personal care product may comprise a cosmetic formulation, such as a face cream, makeup remover, or mascara. The personal care product may also comprise shampoo, a conditioner, or a skin lotion. The personal care product may comprise any product for topical application to a user's skin or hair.

When incorporated into a personal care product, the product may contain an emulsifier, a consistency factor, an emollient, and/or an active ingredient.

Suitable emulsifiers are e.g. anionics as salts of fatty acids e.g. sodium stearate or sodium palmitate, organic soaps e.g. mono-, di- or triethanolaminoeate, sulfated or sulfonated compounds e.g. sodium lauryl sulfate or sodium cetyl sulfonate, saponines, lamepones; cationics as quaternary ammonium salts; nonionics as fatty alcohols, fatty acid ester with saturated or unsaturated fatty acids, polyoxyethylenesters or polyoxyethylenethers of fatty acids, polymers from ethylene oxide and propylene oxide or propylene glycol, amphotherics as phosphatides, proteins as gelatine, casein alkylamidobetaines, alkyl betaines and amphoglycinates, alkyl phosphates, alkylpolyoxyethylene phosphates or the corresponding acids, silicone derivatives, e.g. alkyl dimethiconecoplyol.

Suitable consistency factors are e.g. fatty alcohols or their mixtures with fatty acid esters, e.g. acetylated lanolin alcohol, aluminum stearates, carbomer, cetyl alcohol, glyceryl oleate, glyceryl stearate, glyceryl stearate (and) PEG 100 stearate, magnesium stearate, magnesium sulfate, oleic acid, stearic acid, stearyl alcohol, myristyl myristate, isopropyl palmitate, beeswax and synthetic equivalents thereof, carbomers, and the like. Suitable conditioners are e.g. alkylamido ammonium lactate, cetrimonium chloride and distearoylethyl hydroxyethylmonium methosulfate and cetearyl alcohol, cetyl dimethicone, cetyl ricinoleate, dimethicone, laureth-23, laureth-4, polydecene, retinyl palmitate, quaternized protein hydrolysates, quaternized cellulose and starch derivatives, quaternized copolymers of acrylic or methacrylic acid or salts, quaternized silicone derivatives.

Suitable emollients are e.g. cetearyl isononanoate, cetearyl octanoate, decyl oleate, isooctyl stearate, coco caprylate/caprate, ethylhexyl hydroxystearate, ethylhexyl isononanoate, isopropyl isostearate, isopropyl myristate, oleyl oleate, hexyl laurate, paraffinum liquidum, PEG-75 lanolin, PEG-7 glyceryl cocoate, petrolatum, ozokerite cyclomethicone, dimethicone, dimethicone copolyol, dicaprylyl ether, butyrospermum parkii, buxus chinensis, canola, carnauba cera, *Copernicia cerifera, Oenothera biennis, Elaeis guineensis, Prunus dulcis*, squalane, *Zea mays, Glycine soja, Helianthus annuus*, lanolin, hydrogenated castor oil, hydrogenated coconut oil, hydrogenated polyisobutene, sucrose cocoate, stearoxy dimethicone, lanolin alcohol, isohexadecane.

The compositions may further contain active ingredients, e.g. anti-microbials, anti-inflammatories, plant extracts, bisabolol, panthenol, tocopherol, actives for anti-stinging, anti-irritant or anti-dandruff applications, or anti-aging agents such as retinol, melibiose and the like. Other suitable actives are e.g. *Medicago officinalis, Actinidia chinensis*, allantoin, *Aloe barbadensis, Anona cherimolia, Anthemis nobilis, Arachis hypogaea, Arnica Montana, Avena sativa*, beta-carotene, bisabolol, *Borago officinalis*, butylenes glycol, *Calendula officinalis, Camellia sinensis*, camphor, *Candida bombicola*, capryloyl glycine, *Carica papaya, Centaurea cyanus*, cetylpyridinium chloride, *Chamomilla recutita, Chenopodium quinoa, Chinchona succirubra, Chondrus crispus, Citrus aurantium dulcis. Citrus grandis, Citrus limonum, Cocos nucifera, Coffea Arabica, Crataegus monogina, Cucumis melo*, dichlorophenyl imidazoldioxolan, *Enteromorpha compressa, Equisetum arvense*, ethoxydiglycol, ethyl panthenol, farnesol, ferulic acid, *Fragaria chiloensis, Gentiana lutea, Ginkgo biloba*, glycerin, glyceryl laurate, *Glycyrrhiza glabra, Hamamelis virginiana*, heliotropine, hydrogenated palm glycerides, citrates, hydrolyzed castor oil, hydrolyzed wheat protein, *Hypericum perforatum, Iris florentina, Juniperus communis, Lactis proteinum*, lactose, *Lawsonia inermis*, linalool, *Linum usitatissimum*, lysine, magnesium aspartate, *Magnifera indica, Malva sylvestris*, mannitol, mel *Melaleuca alternifolia, Mentha piperita*, menthol, menthyl lactate, *Mimosa tenuiflora, Nymphaea alba*, olaflur, *Oryza sativa*, panthenol, paraffinum liquidum, PEG-20M, PEG-26 jojoba acid, PEG-26 jojoba alcohol, PEG-35 castor oil, PEG-40 hydrogenated castor oil, PEG-60 hydrogenated castor oil, PEG-8 caprylic/capric acid, *Persea gratissima*, petrolatum, potassium aspartate, potassium sorbate, propylene glycol, *Prunus amygdalus dulcis, Prunus armeniaca, Prunus persica*, retinyl palmitate, *Ricinus communis, Rosa canina, Rosmarinus officinalis, Rubus idaeus*, salicylic acid, *Sambucus nigra*, sarcosine, *Serenoa serrulata, Simmondsia chinensis*, sodium carboxymethyl betaglucan, sodium cocoyl amino acids, sodium hyaluronate, sodium palmitoyl praline, stearoxytrimethylsilane, stearyl alcohol, sulfurized TEA-ricinoleate, talc, *Thymus vulgaris, Tilia cordata*, tocopherol, tocopheryl acetate, trideceth-9, *Triticum vulgare*, tyrosine, undecylenoyl glycine, urea, *Vaccinium myrtillus*, valine, zinc oxide, zinc sulfate.

The present disclosure may be better understood with reference to the following examples.

EXAMPLES

Abbreviations used in the examples that follow:
BIT=1,2 Benzisothiazolin-3-one
ZnPT=Zinc Pyrithione
BBIT=n-butyl Benzisothiazolin DDA=1-dodecylamine

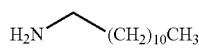

DMODA=N,N-Dimethyloctadecylamine

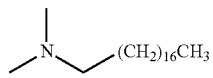

CDMA Oxide=cocodimethylamine oxide

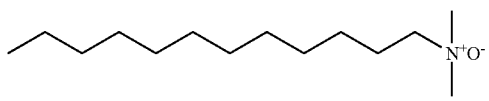

DMOA Oxide=N,N-dimethyloctylamine-n-oxide

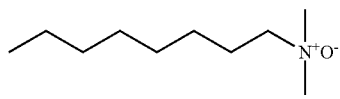

LDMA=lauryl dimethyl amine

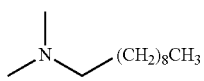

DDM=4-Dodecylmorpholine

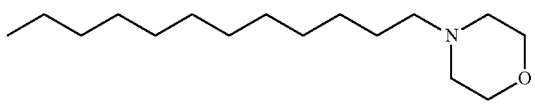 [SMILES: CCCCCCCCCCCCN1CCOCC1]

Example No. 1

The following Minimum Inhibitory Concentration tests ("MIC") were conducted to determine whether an amine compound has any biocide enhancing effect on a pyrithione and on an isothiazolinone.

Microorganisms: *Pseudomonas aeruginosa* ATCC 15442

MIC set up: A 96 well microtiter plate Minimum Inhibitory Concentration (MIC) test was run in broth suitable for the test organism. Serially diluted actives were prepared in sterilized water, and the start-up concentration varied depending on the efficacy range. Inocula prepared in 2× suitable broth was added into each well, and the final concentrations of bacteria were adjusted to approximately $5 \times 10^5$.

TABLE 1

Minimum Inhibitory Concentrations of Blends as ppm of ZPT active.

| Chemicals | Microbes<br>*Pseudomonas aeruginosa* |
|---|---|
| ZnPT | 62.5 |
| DMODA | >640 |
| DDA | 200 |
| DMODA | 291 ppm DMODA |
| ZnPT | 31 ppm ZnPT |
| DDA | 47 ppm DDA |
| ZnPT | 8 ppm ZnPT |

As shown above, DMODA and DDA both enhance the effectiveness of the zinc pyrithione.

TABLE 2

Minimum Inhibitory Concentrations of Blends as ppm of BIT active.

| Chemicals | Microbes<br>*Pseudomonas aeruginosa* |
|---|---|
| BIT | 32.5 |
| DMODA | >640 |
| DDA | 200 |
| DMODA | 305 ppm DMODA |
| BIT | 32.5 ppm BIT |
| DDA | 23 ppm DDA |
| BIT | 4 ppm BIT |

As shown above, DDA had an enhancing effect on the isothiazolin.

Example No. 2

Further MIC tests were conducted using different amine compounds in combination with a pyrithione and two different isothiazolinones. The procedures described in Example No. 1 were used. The following results were obtained:

TABLE 3

Minimum Inhibitory Concentrations of Blends as ppm of ZPT active.

| | *Staphylococcus aureus* | *Escherichia coli* | *Candida albicans* | *Aureobasidium pullulans* | *Aspergillus brasiliensis* |
|---|---|---|---|---|---|
| ZPT | 7.8 | 3.9 | 7.8 | 3.9 | 15.6 |
| CDMA Oxide | 13.9 | 556.9 | 13.9 | 13.9 | 17.4 |
| CDMA Oxide:ZPT* | 1.95 | 31.25 | 0.98 | 1.46 | 1.95 |
| DMOA Oxide | 250.0 | 750.0 | 375.0 | 500.0 | 500.0 |
| DMOA Oxide:ZPT* | 11.7 | 46.9 | 31.25 | 11.7 | 31.25 |

TABLE 3-continued

Minimum Inhibitory Concentrations of Blends as ppm of ZPT active.

|  | Staphylococcus aureus | Escherichia coli | Candida albicans | Aureobasidium pullulans | Aspergillus brasiliensis |
|---|---|---|---|---|---|
| LDMA | 165.6 | 165.6 | 165.6 | 331.3 | 662.5 |
| LDMA:ZPT* | 5.9 | 5.9 | 1.95 | 3.9 | 7.8 |

*10:1 molar ratio

TABLE 4

Minimum Inhibitory Concentrations of Blends as ppm of BBIT active.

|  | Staphylococcus aureus | Escherichia coli | Candida albicans | Aureobasidium pullulans | Aspergillus brasiliensis |
|---|---|---|---|---|---|
| BBIT | 5.0 | 80.0 | 3.75 | 2.5 | 1.9 |
| CDMA Oxide | 13.9 | 556.9 | 13.9 | 13.9 | 17.4 |
| CDMA Oxide:BBIT* | 1.25 | 20.0 | 0.63 | 0.63 | 0.63 |
| DMOA Oxide | 250.0 | 750.0 | 375.0 | 500.0 | 500.0 |
| DMOA Oxide:BBIT* | 5.0 | 80.0 | 3.75 | 2.50 | 2.50 |
| LDMA | 165.6 | 165.6 | 165.6 | 331.3 | 662.5 |
| LDMA:BBIT* | 5.0 | 5.0 | 2.50 | 1.25 | 1.88 |

*10:1 molar ratio

TABLE 5

Minimum Inhibitory Concentrations of Blends as ppm of BIT active.

|  | S. aureus | E. coli | C. albicans | A. pullulans | Aspergillus brasiliensis |
|---|---|---|---|---|---|
| BIT | 8.1 | 6.1 | 8.1 | 4.1 | 32.5 |
| CDMA Oxide | 13.9 | 556.9 | 13.9 | 13.9 | 17.4 |
| CDMA Oxide:BIT* | 0.76 | 4.1 | 0.76 | 1.02 | 1.02 |
| DMOA Oxide | 250.0 | 750.0 | 375.0 | 500.0 | 500 |
| DMOA Oxide:BIT* | 6.1 | 4.1 | 4.1 | 4.1 | 8.13 |
| LDMA | 165.6 | 165.6 | 165.6 | 331.3 | 662.5 |
| LDMA:BIT* | 2.0 | 2.0 | 2.0 | 2.0 | 4.1 |

*10:1 molar ratio

Example No. 3

In the following experiments, a pyrithione, an isothiazolinone, and a biocide enhancing agent in accordance with the present disclosure were combined with a standard acrylic paint. The concentrations of the pyrithione, the isothiazolinone and the biocide enhancing agent were varied. The pyrithione, the isothiazolinone and the biocide enhancing agent were added alone and in various mixtures to the standard acrylic paint.

The acrylic paint was then inoculated three times using a mixed bacterial inoculum. The bacterial inoculum, which comprised a bacterial suspension in water, contained the following four bacteria in equal proportions.

| Organism | ATCC Number |
|---|---|
| Pseudomonas aeruginosa | 10145 |
| Enterobacter cloacae | 7256 |
| Escherichia coli | 11229 |
| Acinetobacter calcoaceticus | 14987 |

The samples were streak plated at 24, 48, and 72 hours after inoculation. The streak plates were rated as follows;

| | | |
|---|---|---|
| 0 = | No growth | Not contaminated |
| 1 = | 1-5 viable microorganisms | Very lightly contaminated |
| 2 = | 6-15 viable microorganisms | Lightly contaminated |
| 3 = | 16-30 viable microorganisms | Moderately contaminated |
| 4 = | 31-45 viable microorganisms | Heavily contaminated |
| 5 = | >45 viable microorganisms | Severely contaminated |

TABLE 5

Test data in standard acrylic paint. Set One.

| Active (ppm) | Active (ppm) | Adjuvant (ppm) | 1st Inoculation | | | 2nd Inoculation | | | 3rd Inoculation | | |
|---|---|---|---|---|---|---|---|---|---|---|---|
| | | | 24 | 48 | 72 | 24 | 48 | 72 | 24 | 48 | 72 |
| Blank (no biocide) | | | 5 | 5 | 5 | 5 | 5 | NA | 5 | 5 | 5 |
| BIT | 60 | | 5 | 5 | 5 | 5 | 5 | NA | 5 | 5 | 5 |
| BIT | 120 | | 1 | 3 | 3 | 5 | 5 | NA | 5 | 5 | 5 |

TABLE 5-continued

Test data in standard acrylic paint. Set One.

| Active (ppm) | | Active (ppm) | | Adjuvant (ppm) | | 1st Inoculation | | | 2nd Inoculation | | | 3rd Inoculation | | |
|---|---|---|---|---|---|---|---|---|---|---|---|---|---|---|
| | | | | | | 24 | 48 | 72 | 24 | 48 | 72 | 24 | 48 | 72 |
| ZPT | 50 | | | | | 3 | 3 | NA | 5 | 5 | 5 | 5 | 5 | 5 |
| | | | | DDA | 600 | 5 | 5 | 5 | 5 | 5 | NA | 5 | 5 | 5 |
| | | | | DDA | 900 | 5 | 5 | 5 | 5 | 5 | NA | 5 | 5 | 5 |
| | | | | DDA | 1200 | 5 | 5 | 5 | 5 | 5 | NA | 5 | 5 | 5 |
| | | | | DDA | 1800 | 2 | 3 | 1 | 5 | 5 | NA | 5 | 5 | 5 |
| | | BIT | 60 | DDA | 600 | 3 | 5 | 5 | 5 | 5 | NA | 5 | 5 | 5 |
| | | BIT | 60 | DDA | 1200 | 2 | 2 | 2 | 5 | 5 | NA | 5 | 5 | 5 |
| | | BIT | 120 | DDA | 600 | 1 | 1 | 0 | 4 | 5 | NA | 4 | 4 | 4 |
| ZPT | 50 | | | DDA | 1200 | 0 | 0 | NA | 1 | 0 | 0 | 5 | 5 | 5 |

TABLE 6

Test data in standard acrylic paint. Set Two.

| Active (ppm) | | Active (ppm) | | Adjuvant (ppm) | | 1st Inoculation | | | 2nd Inoculation | | | 3rd Inoculation | | |
|---|---|---|---|---|---|---|---|---|---|---|---|---|---|---|
| | | | | | | 24 | 48 | 72 | 24 | 48 | 72 | 24 | 48 | 72 |
| | | Blank (no biocide) | | | | 5 | 5 | 5 | 5 | 5 | 5 | 5 | 5 | 5 |
| | | BIT | 25 | | | 5 | 5 | 5 | 5 | 5 | 5 | 5 | 5 | 5 |
| | | BIT | 50 | | | 5 | 5 | 5 | 5 | 5 | 5 | 5 | 5 | 5 |
| ZPT | 25 | | | | | 5 | 5 | 5 | 5 | 5 | 5 | 5 | 5 | 5 |
| ZPT | 50 | | | | | 2 | 3 | 3 | 4 | 5 | 5 | 5 | 5 | 5 |
| | | | | DDA | | 5 | 5 | 5 | 5 | 5 | 5 | 5 | 5 | 5 |
| | | | | CDMA Oxide | | 5 | 5 | 5 | 5 | 5 | 5 | 5 | 5 | 5 |
| ZPT | 25 | BIT | 25 | | | 0 | 0 | 0 | 5 | 5 | 5 | 5 | 5 | 5 |
| ZPT | 50 | BIT | 25 | | | 0 | 0 | 0 | 0 | 0 | 0 | 1 | 4 | 5 |
| ZPT | 25 | BIT | 25 | DDA | 1200 | 0 | 0 | 0 | 1 | 0 | 1 | 5 | 5 | 5 |
| ZPT | 50 | BIT | 25 | DDA | 1200 | 0 | 0 | 0 | 0 | 0 | 0 | 0 | 0 | 0 |
| ZPT | 25 | BIT | 25 | CDMA Oxide | 1200 | 0 | 0 | 0 | 3 | 5 | 5 | 5 | 5 | 5 |
| ZPT | 50 | BIT | 25 | CDMA Oxide | 1200 | 0 | 0 | 0 | 0 | 0 | 0 | 0 | 0 | 0 |

TABLE 7

Test data in standard acrylic paint. Set Three.

| Active (ppm) | | Active (ppm) | | Adjuvant (ppm) | | 1st Inoculation | | | 2nd Inoculation | | | 3rd Inoculation | | |
|---|---|---|---|---|---|---|---|---|---|---|---|---|---|---|
| | | | | | | 24 | 48 | 72 | 24 | 48 | 72 | 24 | 48 | 72 |
| | | Blank (no biocide) | | | | 5 | 5 | 5 | 5 | 5 | 5 | 5 | 5 | 5 |
| | | BIT | 50 | | | 5 | 5 | 5 | 5 | 5 | 5 | 5 | 5 | 5 |
| ZPT | 50 | | | | | 5 | 3 | 5 | 5 | 5 | 5 | 5 | 5 | 5 |
| | | | | DDM | 1200 | 5 | 5 | 5 | 5 | 5 | 5 | 5 | 5 | 5 |
| ZPT | 50 | BIT | 25 | | | 0 | 0 | 0 | 0 | 0 | 4 | 5 | 5 | 5 |
| | | BIT | 50 | DDM | 1200 | 5 | 5 | 5 | 5 | 5 | 5 | 5 | 5 | 5 |
| ZPT | 50 | | | DDM | 1200 | 4 | 2 | 1 | 2 | 2 | 5 | 5 | 5 | 5 |
| ZPT | 50 | BIT | 25 | DDM | 1200 | 0 | 0 | 0 | 0 | 0 | 0 | 0 | 0 | 0 |

TABLE 8

Test data in standard acrylic paint. Set Four.

| Active (ppm) | | Active (ppm) | | Adjuvant (ppm) | | 1st Inoculation | | | 2nd Inoculation | | | 3rd Inoculation | | |
|---|---|---|---|---|---|---|---|---|---|---|---|---|---|---|
| | | | | | | 24 | 48 | 72 | 24 | 48 | 72 | 24 | 48 | 72 |
| | | Blank (no biocide) | | | | 5 | 5 | 5 | 5 | 5 | 5 | 5 | 5 | 5 |
| | | BIT | 50 | | | 5 | 5 | 5 | 5 | 5 | 5 | 5 | 5 | 5 |

TABLE 8-continued

Test data in standard acrylic paint. Set Four.

| Active (ppm) | | Active (ppm) | | Adjuvant (ppm) | | 1st Inoculation | | | 2nd Inoculation | | | 3rd Inoculation | | |
|---|---|---|---|---|---|---|---|---|---|---|---|---|---|---|
| | | | | | | 24 | 48 | 72 | 24 | 48 | 72 | 24 | 48 | 72 |
| ZPT | 50 | | | | | 0 | 0 | 0 | 2 | 0 | 0 | 3 | 5 | 5 |
| | | | | DDA | 600 | 5 | 2 | 0 | 5 | 5 | 5 | 5 | 5 | 5 |
| ZPT | 50 | BIT | 25 | DDA | 600 | 0 | 0 | 0 | 0 | 0 | 0 | 0 | 0 | 0 |
| ZPT | 50 | BIT | 25 | DDA | 400 | 0 | 0 | 0 | 0 | 0 | 0 | 0 | 0 | 0 |
| ZPT | 50 | BIT | 25 | DDA | 200 | 0 | 0 | 0 | 0 | 0 | 0 | 0 | 0 | 0 |
| ZPT | 50 | BIT | 25 | DDA | 100 | 0 | 0 | 0 | 1 | 0 | 0 | 0 | 0 | 0 |

TABLE 9

Test data in standard acrylic paint. Set Five.

| Active (ppm) | | Active (ppm) | | Adjuvant (ppm) | | 1st Inoculation | | | 2nd Inoculation | | | 3rd Inoculation | | |
|---|---|---|---|---|---|---|---|---|---|---|---|---|---|---|
| | | | | | | 24 | 48 | 72 | 24 | 48 | 72 | 24 | 48 | 72 |
| | | Blank (no biocide) | | | | 5 | 5 | 5 | 5 | 5 | 5 | 5 | 5 | 5 |
| | | BIT | 50 | | | 5 | 5 | 5 | 5 | 5 | 5 | 5 | 5 | 5 |
| ZPT | 50 | | | | | 0 | 0 | 0 | 2 | 0 | 0 | 3 | 5 | 5 |
| | | | | CDMA Oxide | 1200 | 5 | 5 | 5 | 5 | 5 | 5 | 5 | 5 | 5 |
| ZPT | 50 | | | CDMA Oxide | 1200 | 0 | 0 | 0 | 2 | 0 | 0 | 1 | 4 | 3 |
| | | BIT | 25 | CDMA Oxide | 1200 | 5 | 5 | 5 | 5 | 5 | 5 | 5 | 5 | 5 |
| ZPT | 50 | BIT | 25 | CDMA Oxide | 1200 | 0 | 0 | 0 | 0 | 0 | 0 | 0 | 0 | 0 |
| ZPT | 50 | BIT | 15 | CDMA Oxide | 1200 | 0 | 0 | 0 | 0 | 0 | 0 | 0 | 0 | 0 |
| ZPT | 50 | BIT | 5 | CDMA Oxide | 1200 | 0 | 0 | 0 | 0 | 0 | 0 | 0 | 2 | 5 |
| ZPT | 180 | BIT | 45 | CDMA Oxide | 1225 | 0 | 0 | 0 | 0 | 0 | 0 | 1 | 0 | 0 |
| ZPT | 100 | BIT | 25 | CDMA Oxide | 680 | 0 | 0 | 0 | 0 | 0 | 0 | 0 | 0 | 0 |
| ZPT | 90 | BIT | 22.5 | CDMA Oxide | 610 | 0 | 0 | 0 | 0 | 0 | 0 | 0 | 0 | 0 |
| ZPT | 80 | BIT | 20 | CDMA Oxide | 545 | 0 | 0 | 0 | 0 | 0 | 0 | 0 | 0 | 0 |
| ZPT | 70 | BIT | 17.5 | CDMA Oxide | 475 | 0 | 0 | 0 | 0 | 0 | 0 | 0 | 0 | 0 |
| ZPT | 60 | BIT | 15 | CDMA Oxide | 410 | 0 | 0 | 0 | 0 | 0 | 0 | 0 | 0 | 0 |
| ZPT | 50 | BIT | 12.5 | CDMA Oxide | 340 | 0 | 0 | 0 | 0 | 0 | 0 | 1 | 3 | 5 |
| ZPT | 40 | BIT | 10 | CDMA Oxide | 270 | 0 | 0 | 0 | 0 | 2 | 5 | 0 | 5 | 5 |
| ZPT | 25 | BIT | 25 | CDMA Oxide | 1200 | 0 | 0 | 0 | 0 | 0 | 0 | 5 | 5 | 5 |

As shown above, the amine compounds were shown to enhance the biocidal properties of the pyrithione and especially of the isothiazlinone.

These and other modifications and variations to the present invention may be practiced by those of ordinary skill in the art, without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed:

1. A composition for preserving a product having biocidal properties comprising:
    a first biocide comprising an isothiazolin-3-one present in the product in an amount of 15 ppm to 25 ppm;
    second biocide comprising zinc pyrithione present in the product in an amount of 50 ppm to 180 ppm; and
    a biocide enhancing agent comprising cocodimethylamine oxide, N, N-dimethyloctyl amine-n-oxide, or mixtures thereof, present in the product in an amount of 410 ppm to 1200 ppm, wherein the first biocide and the biocide enhancing agent are present in the composition at weight ratio of from about 1:600 to about 2:1.

2. The composition as defined in claim 1, wherein the first biocide and the second biocide are present in the composition at a weight ratio of from about 1:200 to about 10:1.

3. The composition as defined in claim 1, wherein the composition contains a second biocide enhancing agent that is different than the first biocide enhancing agent, the second biocide enhancing agent comprising an amine, an amine salt, or an amine oxide.

4. The composition as defined in claim 1, further comprising a zinc compound, the zinc compound comprising a zinc salt of an organic acid, a zinc salt of an inorganic acid, a zinc oxide, a zinc hydroxide, or mixtures thereof.

5. The composition as defined in claim 1, wherein the composition further comprises polyethylenimine.

6. The composition as defined in claim 1, wherein the first biocide comprises 1,2-benzisothiazolin-3-one; 5-chloro-2-methyl-2H-isothiazolin-3-one; 2-methyl-2H-isothiazolin-3-one; 2-Octyl-3(2H)-isothiazolone; dichloro-n-octyl-2H-isothiazolin-3-one; N-methyl-1,2-benzisothiazolin-3-one; N-butyl-1,2-benzisothiazolin-3-one, or mixtures thereof.

7. The composition as defined in claim 1, wherein the second biocide comprises sodium pyrithione, bismuth pyrithione, potassium pyrithione, lithium pyrithione, ammonium pyrithione, zinc pyrithione, copper pyrithione, calcium pyrithione, magnesium pyrithione, strontium pyrithione, silver pyrithione, gold pyrithione, manganese pyrithione, an organic amine pyrithione, or mixtures thereof.

8. The composition as defined in claim 4, wherein the zinc compound comprises zinc acetate, zinc borate, zinc oxide, zinc carbonate, zinc chloride, zinc sulfate, zinc hydroxide, zinc citrate, zinc fluoride, zinc iodide, zinc lactate, zinc oleate, zinc oxalate, zinc phosphate, zinc propionate, zinc salicylate, zinc selenite, zinc silicate, zinc stearate, zinc sulfide, zinc tannate, zinc tartrate, zinc valerate, and mixtures thereof.

9. The composition as defined in claim 5, wherein the polyethylenimine has a branched structure.

10. A product for coating a surface comprising:
a base composition; and
a preservative comprising a first biocide comprising an isothiazolinone; a second biocide comprising zinc pyrithione; and a biocide enhancing agent comprising cocodimethylamine oxide, N, N-dimethyloctyl amine-n-oxide, or mixtures thereof and wherein the first biocide is present in the product at a concentration of 15 ppm to 25 ppm, wherein the second biocide is present in the product at a concentration of 50 ppm to 180 ppm, and wherein the biocide enhancing agent is present in the product at a concentration of 410 ppm to 1200 ppm, and
wherein the first biocide and the biocide enhancing agent are present in the base composition at weight ratio of from about 1:600 to about 2:1.

11. The product as defined in claim 10, wherein the first biocide and the second biocide are present in the product at a weight ratio of from about 1:10 to about 1:4.

12. The product as defined in claim 10, wherein the first biocide and the biocide enhancing agent are present in the product at weight ratio of from about 1:100 to about 10:1.

13. The product as defined in claim 10, wherein the product further comprises polyethylenimine.

14. The composition as defined in claim 1, wherein the first biocide and the biocide enhancing agent are present in the composition at weight ratio of from about 1:400 to about 1:2.

* * * * *